Sept. 1, 1970 J. F. CIRINO 3,526,012
CAR WASHING APPARATUS
Filed March 29, 1968 2 Sheets-Sheet 2

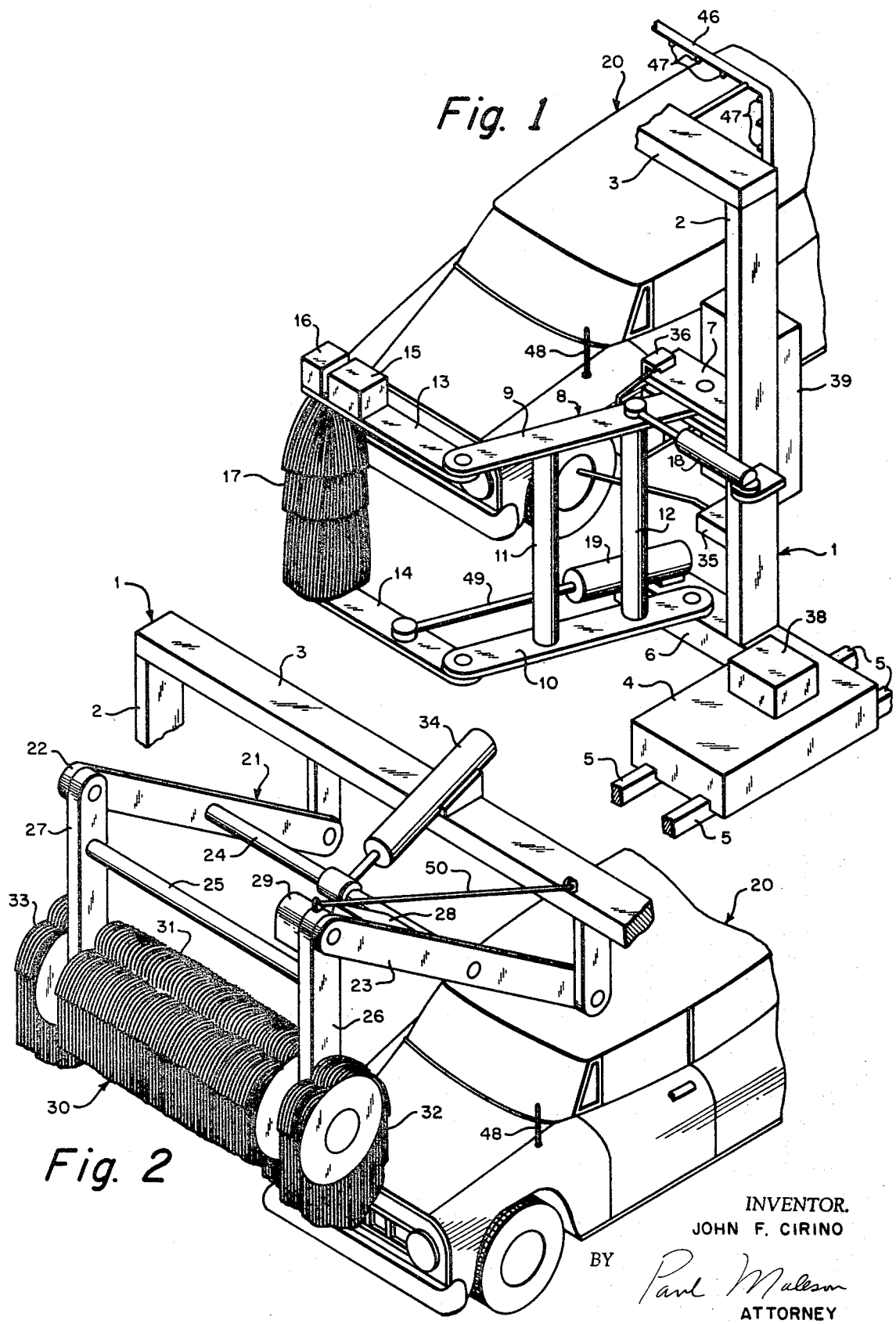

INVENTOR.
JOHN F. CIRINO
BY Paul Maleson
ATTORNEY

United States Patent Office 3,526,012
Patented Sept. 1, 1970

3,526,012
CAR WASHING APPARATUS
John F. Cirino, Churchville, Pa., assignor to Little Darling Corp., Churchville, Pa., a corporation of Pennsylvania
Filed Mar. 29, 1968, Ser. No. 717,212
Int. Cl. B60s 3/06
U.S. Cl. 15—21         7 Claims

ABSTRACT OF THE DISCLOSURE

A means and method for automatically washing road vehicles. A travelling crane traverses the length of the stationary vehicle and returns. The crane is provided with a segmented top brush and and a pair of side brushes. Each of the brushes is mounted on a pivoting trapeze and is urged toward the vehicle and withdrawn from it by the action of a pneumatic cylinder. Limit switches sense the relative positions of brushes and vehicle and control a programmed order of action. The brushes are brought into cleaning actuation in a specific order.

BACKGROUND OF THE INVENTION

Field of the invention

This invention relates to the art of cleaning road vehicles and in particular to the art of automatically washing and cleaning automobiles. More particularly, it relates to that type of automatic automobile washer wherein the automobile is positioned with respect to the apparatus and remains stationary during the washing procedure. The sprays and brushes travel the length of the automobile.

Description of the prior art

The art of providing automobile washing devices and methods in which the automobile remains stationary is well developed. Such washing devices are known as the roll-over type of automatic car washer. Patents such as Cirino et al. 3,238,551 and Vani et al., 2,987,067 disclose structure of this general type. These and other patents and known prior art devices and methods do not disclose certain specific improvements in structure and method as set forth in this patent.

Summary of the invention

It is an object of this invention to provide an automatic car washing apparatus of the roll-over type.

It is another object of this invention to provide an automatic car washing apparatus including a segmented multiple-purpose top brush, and a pair of side brushes, all mounted on a single traveling crane, and all actuated by pneumatic cylinders, and all programmed to be in cleaning contact with the vehicle in a specific order, with the relative positions of the brushes and the vehicle determined by limit switches contacting the vehicle.

Other aims and objects of the invention are made apparent in the following specification and claims in which like reference numerals refer to like parts.

A single crane having an inverted U-shape is provided transverse to the longitudinal direction of a vehicle. The crane is selectively movable along the length of the vehicle. A top brush is provided on the cross-bar of the crane. This top brush is a multiple purpose segmented rotating brush. It has a major central section and on each side thereof, it has an extension brush, each of the extension brushes comprising a minor extent of the top brush, and each of them spaced apart from the central section. The extension brushes have a larger diameter than the central section. A rotating side brush is mounted on each of the upright legs of the crane. All of the brushes are mounted on pivoting trapezes with pneumatic actuators enabling the brushes to be brought into or out of contact with the car. Electric motors rotate all the brushes. Limit switches sense the position of the car relative to the brushes. Limit switches on the trapeze arms sense the degree of extension of the arms. The side brushes initially move toward each other and the car, passing across the front of the car and cleaning. Then they return to their retracted positions. As the side brushes retract, the top brush contacts the car. The crane travels and the side brushes again move from their retracted positions into contact with the car to clean the sides of the car.

At the rear end of the car, the crane stops and the two side brushes travel across the back of the car and then retract. The top brush lifts, and the back of the car is recleaned. The crane then travels back to its starting position.

Brief description of the drawings

FIG. 1 is a perspective view taken from the right and above of one of the side brushes and its associated structure, facing the front end of the car, FIG. 2 is a perspective view, taken from the right and above, of the top brush and its associated structure, taken facing the front of the car.

DESCRIPTION OF THE PREFERRED EMBODIMENT

Description of the apparatus

Figure 3:
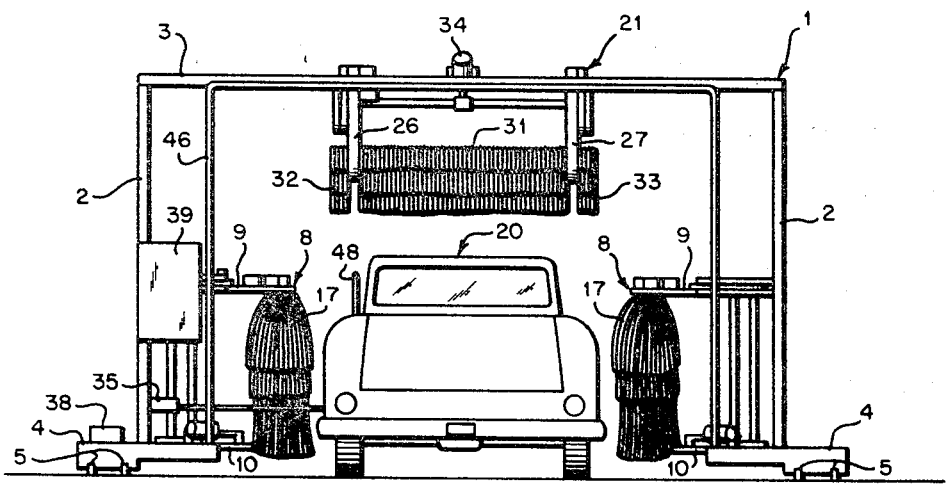
FIG. 3 is an elevation view of the entire apparatus, simplified to show the disposition of the major parts thereof, taken facing the rear of the car.

The term "wash" used herein refers generally to the functions performed by the apparatus in this art, without regard to whether it pertains to a scrubbing step or a liquid application step. The term "car" used herein refers generally to any vehicles capable of moving or being moved into position within the apparatus.

A car 20 is positioned within the car washing apparatus, generally designated 46. After having been positioned, the car remains stationary throughout the washing operation. The apparatus 46 has as its main structural feature a crane 1. The crane 1 is an inverted U-shaped structural member having a pair of vertical legs 2 and a cross-beam 3 connecting the tops of the vertical legs. The crane spans the car 20 and is arranged so that the cross-beam 3 extends transverse to the length of the car and above it with substantial clearance. Each vertical leg 2 rests on a base 4. Each base 4 is in turn provided with a set of wheels (not shown) which are arranged to run on parallel rails 5. The rails 5 run parallel to the length of the car. In the embodiment shown, each leg is supported on a pair of rails 5 for additional stability. Means are provided to move the crane along the rails 5 so that it may travel from one end of the car to the other. This crane moving means 38 is an electric motor mounted on one of the bases 4 and connected to at least one of the wheels 37 through conventional drive means. Means for moving travelling cranes of this type are well known in the art, and the present invention is not directed to any detailed structure thereof.

In broad outline, major components of the apparatus include a pair of side brushes 17. Each of the vertical legs 2 has a side brush 17 mounted thereon, so that two side brushes are provided, one on each side of the car. Another major component is a segmented top brush 30. All the brushes are rotatable, and the side brushes have substantially vertical axes of rotation. The top brush has a substantially horizontal axis of rotation and is arranged substantially parallel to the cross-beam 3 and hence transverse and substantially right angles to the length of the car 20.

The structure of the top brush is best shown in FIG. 2. The top brush is generally designated 30. It is a rotatable brush, preferably made of a plurality of rleatively flexible strands of fiber arranged on a shaft or axle. It comprises a central portion 31 and two top brush extensions respectively 32 and 33. The extensions 32 and 33 are segments of brush mounted on the same shaft as is the central portion. The central portion comprises the major axial extent of the top brush, and each of the extensions comprise a minor portion thereof. There is a gap in the provision of the brush strands between the central portion and each of the extensions. The brush is mounted for support and rotation in this gap. The axial length of the central portion 31 is approximately the same as the average transverse width of the roofs or tops of cars to be washed as best seen in FIG. 3. The axial length of each of the extension brushes is such that the total axial length of top brush 30 is approximately the over all width of the average car to be washed. It is of course apparent that these dimensions of cars may differ, but when the most common examples of ordinary standard or full cars are considered, the variation in dimension is not excessive and a simple dimensioning to accommodate any popular full sized car provides suitable dimensions for most other cars.

A major purpose of providing the extensions is to automatically thereby produce a means for clearing upright car radio antennas in their most common position, extending upwardly from the inboard top of a front fender on one side or the other. In FIG. 3 such an antenna 48 is shown.

The extension brushes 32 and 33 are provided with longer strands than those in the central portion 31, so that when the brush is rotating and the strands fly out, the extension portions have a larger effective diameter. When the brush is stationary, the natural droop of the strand makes the extension portions appear to hang lower but not extend substantially higher than the strands of the central portion. The extension portions help to wash portions of the car that would be difficult or impossible to reach with the top brush alone or the side brushes alone. They are effective in reaching the upper inboard surfaces of the fenders and the side windows and similar portions of the car. Thus, in this invention, the extension portions of the top brush 30 take the place of the separate window brushes which are provided in other expedients.

The top brush 30 is mounted on the crossbeam 3 by means of a trapeze structure generally designated 21. The trapeze 21 generally comprises a pair of first arms 22 and 23 pivoted on the crossbeam and extending outwardly therefrom in a direction closer to horizontal than to vertical.

At the ends of the first arms 22 and 23, a pair of second arms respectively 27 and 26 are pivoted. These second arms extend approximately vertically downwards. A brace 24 extends between the first arms 22 and 23 and stabilizes and strengthens them. A brace 25 extends between the second arms 26 and 27 and strengthens and stabilizes them. A pivoted tie rod 50 runs from cross beam 3 to the top of arm 26.

The second arms 26 and 27 terminate in bearings supporting the shaft of the top brush 30. This support is provided in the gaps between the central portion and the brush extensions.

Means are provided to rotate the brush. These means include a motor 28 mounted on arm 23. This motor is connected by means of a conventional drive 29 to the brush 30. The drive means as illustrated is shrouded.

Means to position and apply the brush are provided. These means comprise an actuating pneumatic cylinder 34 provided between the crossbeam 3 and the brace 24 as shown. It is apparent that when cylinder 34 is operated so as to extend its rod, the trapeze swings downwardly and the brush is therefore depressed, and conversely, when the cylinder 34 is actuated to shorten its rod extension, the trapeze is swung upwardly.

The structure and operation of the side brushes are best shown in connection with FIG. 1, which illustrates one of the two identical side brush assemblies. A base extension 6 extends inwardly toward the car from the base 4 and the vertical leg 2 is mounted on the base extension. A side brush trapeze 8 is mounted on the crane by being affixed partly to the vertical leg 2 and partly to the base extension 6. A mounting bar 7 is provided on the leg 2. A first pair of arms 9 and 10 are attached for pivoting to mounting bar 7 and base extension 6 respectively. At the other end thereof, these first side brush arms are attached respectively to a pair of second side brush arms 13 and 14, with that connection also being pivotal. Braces 11 and 12 are provided between the pair of first arms 9 and 10 to provide stability and strength to the side brush trapeze 8.

At the far end of the pair of second arms 13 and 14, a side brush 17 is provided. The shaft or axle of this brush is substantially vertical and substantially parallel to the vertical leg 2. The brush 17 is mounted for rotation on the trapeze. Means to rotate the brush are provided, and these means include a motor 15 mounted on the arm 13, and operatively connected to drive brush 17 through a transmission or drive 16. In the embodiment shown, the drive 16 includes a right-angle gear train.

The brush 17 is similar in its construction to that of the top brush as has been described. It preferably consists of a plurality of strands having enough flexibility so that they droop when the brush is stationary. When the brush rotates, the strands fly out straight. The length and vertical positioning of side brush 17 is such that it will extend vertically across either the front-most or rear-most surfaces of cars to be washed, and will extend vertically the extent of the sides of cars to be washed to a point where it joins the area to be covered by the top brush extensions.

Means to collapse and open the trapeze 8 are provided. These means include pneumatic actuation cylinder 18. This cylinder is connected between the vertical leg 2 and the first side brush arm 9. The connections are pivoted. It is apparent that when the cylinder 18 is actuated so as to extend its rod, the trapeze 8 opens and swings the brush 17 away from the vertical leg 2 and toward the car 20, and conversely when the cylinder 18 is actuated so as to shorten its rod, the trapeze closes and moves brush 17 away from the car.

On the side brush assemblies, another motion is selectively imparted as well. A tie rod 49 is provided, pivotally connected, between base extension 6 and second side bar arm 14. This tie rod prevents the second set of side bar arms 13 and 14 from swinging uncontrollably as the trapeze 8 is actuated. A pulling means for the second side bar arms is provided. This second side bar arm pulling means includes a pneumatic actuation cylinder 19 which is operatively connected to the tie rod 49. Thus, as the cylinder 19 is actuated so as to extend its piston rod, the tie bar 49 is lengthened and conversely, when the piston rod of the cylinder 19 is retracted into the cylinder, the tie rod 49 is shortened. This has the effect of swinging the second pair of arms 13 and 14 around their pivoting connection with the first pair of arms 9 and 10. The purpose of this as a means is explained further below.

A limit switch 35 is provided on the vertical leg 2, and its tripping arm extends toward the car 20 to an extent so that when the crane 1 is abreast of the car, the tripping arm of the limit switch 35 is displaced by contact with the car, and the limit switch 35 is actuated. The function of this switch is explained further below.

Another limit switch is also provided in connection with the side arm assemblies. This is an arm position sensing means and takes the form of a limit switch 36 provided on the mounting bar 7 and set so that when the trapeze 8 has opened to a predetermined amount, the first side arm 9 will strike the tripping lever of the limit switch 36 and actuate the switch. The function of this switch is explained further below.

The matching side brush on the other side of the car, from that as illustrated in FIG. 1, is the same except that it does not require the separate crane moving means 38 nor the car-crane relative position sensing means limit switch 35.

Another element of the over all car washing apparatus involves means to provide wash water, detergent, rinse water and wax to the car as part of the over all washing operation. These materials are sprayed onto the car. In FIG. 1, the spray means are shown attached to the vertical legs 2 and the cross beam 3 of the crane 1. The spray means include a pipe 46 having thereon a plurality of spray nozzles 47. These spray nozzles are directed toward the car. Only a fragment of this spray system is illustrated. It is understood that it extends along the length of the crane 1 so that all parts of the car to be washed are brought adjacent at least one spray nozzle 47. The associated elements of the spray system, such as pumps, tanks, etc. are not shown and described in detail herein because their structure per se does not itself form a part of this invention.

Figure 4:
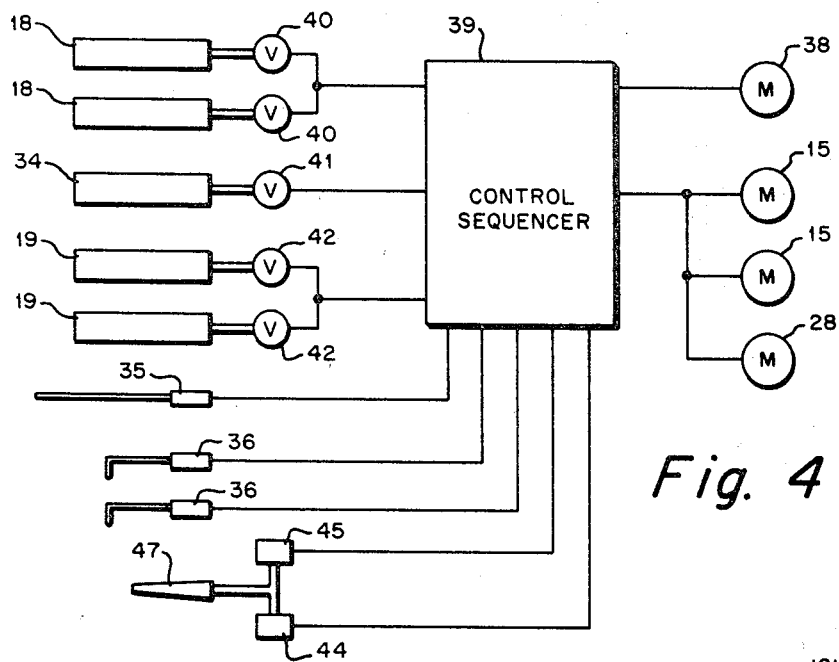
FIG. 4 is a schematic layout of the actuated and control elements of the apparatus.

The sequence and order of the operations performed by the various elements of this apparatus are controlled through a sequencer control 39. This control means is functionally connected to the various sensing and operating elements of the apparatus as schematically shown in FIG. 4. It is entirely conventional and is provided with the necessary switches and sequencing switches, and delay switches in accord with well known practice. The manner and order of sequenced operations is further discussed below in the next section of this patent.

Referring to FIG. 4, the crane moving means 38, an electric motor, is controlled from the control means or sequencer control 39. Each of the side brushes is provided with a motor 15 and the top brush is provided with a motor 28, and these are simultaneously functionally controlled from control means as shown. Each side brush actuating cylinder 18 is provided with a valve 40, and these two cylinders are simultaneously controlled from the control means. The top brush actuating cylinder 34 is provided with a valve 41 and this is independently functionally connected to and controlled from the control means 39.

The side brush pulling means actuating cylinders 19 of which there are two, are each provided with control valve 42 and are simultaneously controlled from the control means. The car-crane relative position sensing means limit switch 35 is functionally connected to the control means and the side brush arm position limit switches 36 of which there are two, are each independently connected to the control means 39 also. The spray means, schematically shown by the spray nozzle 47 in FIG. 4, is provided with alternate supplies of liquid, governed respectively by the water supply control valve 44 and the wax supply control valve 45, each of which are independently functionally controlled from the control means. The liquid application means has been simplified here as elsewhere in the patent, since its detailed structure is not in itself the inventive aspect herein.

Mode of operation

The cycle of operation starts with the crane retracted on its rails 5 to the position most remote from the place of entrance of the car 20. The car 20 is driven into the apparatus until its front closely approaches or just touches the crane-car position sensing limit switch 35.

The apparatus cycle is then started as by operation of a manual switch. The control means 39 actuates the crane moving motor 38 to move the crane in a forward direction toward the car. This motion continues until limit switch 35 is deflected by contact with the car and the crane motion then stops. The brush motors 15 and 28 are then actuated and the brushes begin to revolve. At this point, all brushes are in their retracted positions.

The side brush control cylinder 18 are then both actuated in the direction as aforesaid to open the trapezes. The limit switches are positioned so that as the side trapezes 8 open, the side brushes pass across the front-most surface of the car. It is apparent that to insure this, the height of the limit switch 35 is such that it contacts the front-most surface of the car. The motors 15 of the side brush rotate in a direction such that the brushes 17 rotate with the direction of travel of the brush along the surface of the car, that is, with a rolling motion of the brush with respect to the car surface.

As the side brushes advance toward each other, the following additional preferable operation takes place. Each of the side brush pulling cylinders 19 is actuated to shorten the tie rods 49 and swing the side brushes 17 forwardly toward the front surface of the car. It is understood that all actuation cylinders provide a degree of force which is not great enough to stall the brushes against the car surfaces or to damage the car surfaces. The continually applied pneumatic pressure in the cylinders provides a type of elastic pressure forcing the brushes against the car surfaces so that the brushes follow the contours of the car surface. Thus, it is apparent that the contraction of the pulling actuators 19 permits the side brushes 17 to follow indentations and other contours across the front surface of the car 20.

The side brushes continue to move toward each other across the front surface of the car until they substantially meet and begin to interfere. The arm position sensing means 36 provided on each side trapeze 8 now comes into play. It is set so that when the arms 9 and 10 have swung open to an extent so that the fixed geometry of the crane starts to bring the brushes into contact, the limit switch 36 is tripped. This tripping is individual for each of the side brushes. When the switch 36 is tripped, the direction of rotation of motor 15 and hence of side brush 17 is reversed, and the direction of actuation of cylinder 18 is reversed so that the side brushes start to retract. Thus, the front of the car gets a second scrubbing by the brushes as they retrace their path.

As the side brushes retract to a position, the top brush actuation means, pneumatic cylinder 34, is actuated to extend its rod and hence lower the top brush 30 which contacts the hood of the car and starts to clean it. The rotation of top brush 30 is also in the direction of travel of the brush along the surface of the car, that is with a rolling motion.

Crane moving means 38 is again actuated in a forward direction and the crane starts to move along the length of the car, front to rear thereof. The side brush actuation means 18 are again actuated to open the side bar trapezes. This forces the side brushes 17 against the sides of the car as the crane passes along it, with the elastic application of force, as has been described above, serving to keep the side brushes 17 in contact with the sides of the car. The pulling cylinders 19 are not used at this stage, and the tie rod 49 is preferably held at a fixed length, preferably the initial fully extended length.

In the same manner as the side brushes 17 traverse the sides of the car, the top brush 30 traverses the top of the car to an extent as has been described, with the elastic pressure application aspect of pneumatic cylinder 34 permitting the top brush to ride over the windshield and the top of the car. It is apparent that the stroke travel of cylinder 34 is sufficiently long to permit this degree of freedom.

When the rear end of the car is reached by the crane, limit switch 35 clears the side of the car and the crane motor 38 stops. The position of the limit switch is such that the side brushes 17 now also clear the sides of the car and are free to move toward each other across the rear surface of the car. Preferably, the pulling means 19 is again actuated in a direction to lengthen tie rod 49 and thus elastically press the side brushes 17 against the rear car surfaces. The arm sensing switches 36 act in the same manner as is described above, and the side brushes 17 reverse their direction for rotation and the side brush trapezes 8 start to close. The top brush actuating means 34 is then actuated to shorten its rod and hence raise the top brush out of the way. The in and out sequence of the two sides brushes is then repeated with the top brush out of the way. The purpose of this second pass is to assure the cleaning of the rear surfaces of the car since during the first pass, the top brush is in the lower position and may prevent a full cleaning.

It has been stated that the car-crane relative position sensing limit switch 35 is so located that the side brushes 17 are put in position to traverse the front and rear surfaces as has been described. A time delay switch may be provided so that the crane motor 38 continues operation for a selected period of time after an actuation of the limit switch 35 to permit a selected degree of overtravel of the crane to bring the side brushes into the proper position relative to the front or rear surfaces of the car if the geometry of the apparatus does not automatically provide this. Such time delay switches are of course well known expedients.

After the rear surface of the car is washed, all brushes are retracted to their closed positions, and all brush motors are shut off so that the brushes are non-rotating.

The liquid application steps are now described, starting with the beginning of the cycle. When the operation starts, water supply valve 44 is actuated and hot water and detergent are sprayed on the tops and sides of the car, and this action continues until the car is rinsed. Then, the water supply through valve 44 is shut off, and the wax supply through valve 45 is provided and is sprayed through the nozzles 47. In the preferred embodiment, wax is sprayed from a trailing set of spray nozzles and first water is sprayed as a rinse from a leading set of spray nozzles during the return travel of the crane 1 to its starting position.

When crane 1 reaches its initial position, all elements are positioned to their starting conditions, and the operation shuts down.

The scope of this invention is to be determined by the appended claims and not limited to the foregoing description and drawings which are illustrative.

I claim:
1. A car washing apparatus for washing a car having a length, a top, and a pair of sides, and adapted to be moved into position within said apparatus, comprising:
 (a) a movable crane disposed adjacent each of said sides and over said top of said car, transverse to said length of said car, said crane comprising a cross beam transverse to said length of said car and a pair of vertical legs, one of said legs being disposed adjacent each of said sides of said car and supporting said cross beam, and each of said legs fixedly mounted on a base, each said base having an inwardly extending portion,
 (b) selectively operable means to move said crane along said length of said car,
 (c) A single pair of rotatable side brushes on said crane, one said side brush being provided adjacent each said side of said car, each said side brush having a vertical axis of rotation,
 (d) a single rotatable top brush on said crane above said car, said top brush having an axis of rotation horizontal and transverse to said length of said car,
 (e) means to rotate each of said brushes,
 (f) means to selectively move all of said brushes to and away from contact with said car, said means to move each of said side brushes comprising
  (1) a first pair of arms, each of said arms pivotally affixed at one end thereof to one of said vertical legs of said crane, and pivotally affixed at the other end thereof respectively to a second pair of arms, said second pair of arms supporting said side brush therebetween and
  (2) means to selectively pivot said first pair of arms around said vertical legs and to elastically press said brushes against said car,
  (3) means to pivot said second pair of arms with respect to said first pair of arms when said means to pivot said first pair of arms is actuated, said means to pivot said second pair of arms comprising a tie rod pivotally attached at one end thereof to one of said second arms and at the other end thereof to said inwardly extending portion of said base, and means to selectively shorten and lengthen said tie rod,
 (g) means to sense the relative position of said car and said crane and means to control the operation of said crane and each of said brushes.

2. A car washing apparatus as set forth in claim 1 wherein said means to selectively pivot said first pair of arms includes a pneumatic actuation cylinder affixed between said vertical leg and one of said first arms.

3. A car washing apparatus as set forth in claim 1 wherein a car-crane relative position sensing limit switch is provided on at least one of said vertical legs, said limit switch being positioned to be tripped when said crane is abreast of said car, said limit switch controlling the operation of said means to move said crane.

4. A car washing apparatus as set forth in claim 1 wherein said top brush is segmented, including a central portion extending the major axial length thereof and a pair of extension portions on each end of said central portion, each of said extension portions having an axis of rotation which is an extension of the axis of rotation of said central portion, and all of said segments being rotated by the same said rotation means.

5. A car washing apparatus as set forth in claim 4 wherein the axial length of said central portion is approximately the width of said top of said car, and the said means to move said top brush to and away from said car includes a first pair of arms, each pivoted at one end thereof to said cross beam, and each pivotally connected at the other end thereof to one of a second pair of arms, said second pair of arms supporting said top brush, and said means to selectively raise and lower said top brush including a pneumatic actuation cylinder mounted between said cross beam and said first pair of arms.

6. A car washing apparatus as set forth in claim 5 wherein there is a gap between said central portion and each of said extension portions, and said top brush includes a plurality of flexible elongated strands, and the strands comprising said extension brushes are longer than the strands comprising said central portion brush.

7. A car washing apparatus as set forth in claim 6 wherein a limit switch is provided on said base, said limit switch positioned to be tripped when said first arm comprising part of said means to move said side brush has pivoted to a maximum open position, said tripped limit switch controlling said means to pivot said side brush to cause said side brush to retract.

References Cited

UNITED STATES PATENTS

| | | |
|---|---|---|
| 2,025,780 | 12/1935 | Rosebrook. |
| 3,187,359 | 6/1965 | Takeuchi. |
| 3,233,264 | 2/1966 | Nickl et al. |

(Other references on following page)

UNITED STATES PATENTS

| | | |
|---|---|---|
| 3,271,803 | 9/1966 | Cirino et al. |
| 3,300,803 | 1/1967 | Seakan. |
| 3,310,824 | 3/1967 | Beer. |
| 3,350,733 | 11/1967 | Hanna. |
| 3,428,983 | 2/1969 | Seakan. |
| 3,432,870 | 3/1969 | Emanuel et al. |
| 3,434,173 | 3/1969 | Kenyon et al. |
| 3,438,077 | 4/1969 | Eubanks. |

FOREIGN PATENTS

| | | |
|---|---|---|
| 1,196,147 | 5/1959 | France. |
| 892,598 | 3/1962 | Great Britain. |

MORRIS O. WOLK, Primary Examiner

J. T. ZATARGA, Assistant Examiner

U.S. Cl. X.R.

134—6